US010513581B2

(12) United States Patent
Jeol et al.

(10) Patent No.: US 10,513,581 B2
(45) Date of Patent: Dec. 24, 2019

(54) SULFONATE-MODIFIED POLYAMIDE HAVING IMPROVED BARRIER PROPERTIES

(75) Inventors: Stéphane Jeol, Lyons (FR); Louise-Anne Fillot, Vaulx-en-Velin (FR)

(73) Assignee: RHODIA OPERATIONS, Aubervilliers (FR)

( * ) Notice: Subject to any disclaimer, the term of this patent is extended or adjusted under 35 U.S.C. 154(b) by 0 days.

(21) Appl. No.: 13/700,629

(22) PCT Filed: May 19, 2011

(86) PCT No.: PCT/EP2011/058179
§ 371 (c)(1),
(2), (4) Date: Feb. 15, 2013

(87) PCT Pub. No.: WO2011/147739
PCT Pub. Date: Dec. 1, 2011

(65) Prior Publication Data
US 2013/0150524 A1 Jun. 13, 2013

(30) Foreign Application Priority Data

May 28, 2010 (FR) ...................... 10 54133

(51) Int. Cl.
| C08G 69/42 | (2006.01) |
| C08L 77/00 | (2006.01) |
| C08L 77/06 | (2006.01) |
| F16L 9/12 | (2006.01) |
| F16L 11/04 | (2006.01) |
| C08L 23/26 | (2006.01) |
| C08L 61/04 | (2006.01) |

(52) U.S. Cl.
CPC .............. *C08G 69/42* (2013.01); *C08L 77/00* (2013.01); *C08L 77/06* (2013.01); *F16L 9/12* (2013.01); *F16L 11/04* (2013.01); *C08L 23/26* (2013.01); *C08L 61/04* (2013.01); *C08L 2205/02* (2013.01)

(58) Field of Classification Search
None
See application file for complete search history.

(56) References Cited

U.S. PATENT DOCUMENTS

| 3,654,237 | A | | 4/1972 | Kosel et al. |
| 3,846,507 | A | | 11/1974 | Thomm et al. |
| 5,443,867 | A | | 8/1995 | Mehra et al. |
| 5,889,138 | A | * | 3/1999 | Summers ...................... 528/310 |
| 5,959,069 | A | | 9/1999 | Gluck et al. |
| 6,160,080 | A | | 12/2000 | Cucinella et al. |
| 6,353,084 | B1 | | 3/2002 | Warzelhan et al. |
| 6,525,166 | B1 | | 2/2003 | Di Silvestro et al. |
| 6,867,256 | B1 | | 3/2005 | Di Silvestro et al. |
| 6,872,800 | B1 | | 3/2005 | Bouquerel et al. |
| 2004/0059056 | A1 | * | 3/2004 | Montanari et al. ............. 525/66 |
| 2006/0248655 | A1 | * | 11/2006 | Lambert et al. ............. 8/115.51 |
| 2010/0151173 | A1 | | 6/2010 | Peduto |
| 2011/0196093 | A1 | * | 8/2011 | Ortiz ...................... C08G 69/04 525/52 |

FOREIGN PATENT DOCUMENTS

| EP | 0 672 703 A1 | 9/1995 |
| EP | 0 682 057 A1 | 11/1995 |
| EP | 0 832 149 B1 | 4/1998 |
| FR | 2 743 077 A1 | 7/1997 |
| FR | 2 779 730 A1 | 12/1999 |
| FR | 2 915 484 A1 | 10/2008 |
| WO | 99/03909 A1 | 1/1999 |
| WO | 00/68298 A1 | 11/2000 |
| WO | 2005/023530 A1 | 3/2005 |

OTHER PUBLICATIONS

International Search Report dated Jul. 20, 2011, by the European Patent Office as the International Searching Authority in International Patent Application No. PCT/EP2011/058179.

* cited by examiner

*Primary Examiner* — Robert T Butcher
(74) *Attorney, Agent, or Firm* — Dentons US LLP

(57) ABSTRACT

The use of a polyamide modified by sulfonate functions which has improved barrier properties is described. Further described is the use of a sulfonate, aliphatic or aromatic compound for manufacturing a modified polyamide having improved fluid-barrier properties. The composition as described includes a modified polyamide, which is optionally a composition in the form of granules or powder used in manufacturing articles by an injection or extrusion blow-molding method.

13 Claims, No Drawings

SULFONATE-MODIFIED POLYAMIDE HAVING IMPROVED BARRIER PROPERTIES

CROSS-REFERENCE TO PRIOR APPLICATIONS

This application is a National Stage of PCT/EP2011/058179, filed May 19, 2011, and designating the U.S. (published in French on Dec. 1, 2011, as WO 2011/147739A1; the title and abstract were published in English), which claims priority to FR 10/54133, filed May 28, 2010, each hereby expressly incorporated by reference in its entirety and each assigned to the assignee hereof.

The present invention relates to the use of a polyamide modified by sulfonate functions having improved barrier properties. The invention relates more specifically to the use of a sulfonate, aliphatic or aromatic compound for manufacturing a modified polyamide having improved fluid-barrier properties. The composition according to the invention comprising the modified polyamide is preferably a composition in the form of granules or powder used in manufacturing articles by means of an injection molding or extrusion blow-molding method.

Industrial polyamides are used for the preparation of numerous articles in various fields, such as the motor vehicle field, where specific properties of stiffness, impact strength, dimensional stability, in particular at relatively high temperatures, surface appearance, density, and weight are particularly desired. The choice of a material for a given application is generally guided by the level of performance required with regard to certain properties and by its cost. Indeed, novel materials capable of meeting requirements in terms of performance and/or costs are always sought. It is known in the prior art to use polyamide substances to manufacture single- or multilayer articles intended to contain or transport a fluid such as, for example, tubes, pipes or tanks.

However, it is often necessary to improve these materials to give them satisfactory barrier properties to gases or fluids.

For example, using multilayer, in particular trilayer, tubes or tanks is known; where each layer may be constituted of different materials to give the ensemble the barrier and mechanical properties required depending on the applications. However, such multilayer articles are expensive to produce and delamination problems can occur between incompatible materials in the different layers.

It is also known to use plastic matrices, in particular polyamide matrices and lamellar nanofillers, to reduce permeability. Such reduced permeability is attributed to a "tortuosity" effect caused by nanofillers. The most explored lamellar nanofillers today are smectite clays, mainly montmorillonite. However, it is difficult to use these products insofar as it is necessary to exfoliate them in the matrix in particular using intercalation agents to obtain individual lamellae with high shape factors.

Moreover, using sulfonate-derived aromatic polyamides is also known for manufacturing permselective membranes. However, the aromatic polyamides are very difficult to use.

Accordingly, until now, the prior art has proposed complex solutions to improve barrier properties in plastic materials that are difficult to implement and expensive; moreover often in view of other properties of plastic materials such as in particular mechanical properties and processability. It is accordingly desirable to develop polyamide materials that deliver effective levels of impermeability and avoid the drawbacks mentioned previously.

INVENTION

The applicant has shown in a very surprising manner that using an organic aromatic or aliphatic "sulfonate compound" gives the polyamide improved fluid barrier properties; what is more, it does so without negatively altering the other properties of said materials. The solution of the invention enables the not only avoidance of the drawbacks known from the prior art, but also delivers very high fluid barrier properties.

The polyamide materials of the invention also present good mechanical properties, such as, for example, a good modulus/impact compromise, and/or a heat resistance allowing manipulation and use at high temperatures.

The main object of the present invention is the use of a (co)polyamide comprising at least aliphatic monomers and optionally aromatic monomers and modified by a sulfonate compound, to make articles with improved fluid barrier properties; in particular articles intended to contain or transport a fluid such as, for example, tubes, pipes or tanks. The invention also relates to use of a composition comprising at least one (co)polyamide comprising at least aliphatic monomers and optionally aromatic monomers, and modified by a sulfonate compound, to make articles with improved fluid barrier properties.

The invention also relates to use of a (co)polyamide comprising at least aliphatic monomers and optionally aromatic monomers, and modified by a sulfonate compound, to improve the fluid barrier properties of a polyamide composition.

Materials or articles with improved fluid barrier properties are understood to mean objects that present reduced permeability to a fluid. According to the present invention, the fluid can be a gas or liquid. As gases, in particular oxygen, carbon dioxide, hydrogen, helium, nitrogen, light hydrocarbons, such as ethane, propane, ethylene and propylene, and water vapor can be cited. As liquids, nonpolar solvents, in particular solvents representative of gasolines such as toluene, isooctane and/or polar solvents such as water and alcohols (methanol, ethanol, etc.), refrigerants (ethylene glycol) and mixtures of nonpolar solvents, polar solvents and nonpolar/polar solvents, such as, for example, alcohol-blend gasolines such as E10 and E85 gasolines can be cited. II should be noted that liquids can have varied viscosities, such as in particular high viscosity liquids related to gels or creams.

"Sulfonate compound" is understood to mean an aromatic or aliphatic organic compound comprising at least one —$SO_3X$ function. —$SO_3X$ represents —$SO_3H$ or —$SO_3M$; M being a substituent that replaces the —$SO_3H$ proton to form an inactive salified group. M can in particular be selected from among elements from the periodic table such as alkali metals, including in particular Li, Na, K, Cs, alkaline earth metals, including in particular Ca, Mg, Ba, transition metals, including in particular Ti, Zr, Cr, Mn, Fe, Co, Ni, Cu, Zn, Ag, poor metals, including in particular Al, Pb, Sn, Ga, metalloids, including in particular Sb, Ge, Si, rare earths, or any other type of cation such as ammonium $NH_4^+$.

"Inactive" salified group is understood to mean a salified group that does not react with amine or acid functions, particularly with amine and acid functions on the monomers at the origin of the polyamide of the invention.

M is preferably an alkali metal, preferably sodium or lithium, an alkaline earth metal, preferably calcium or magnesium, or a metal selected from among copper, zinc or aluminum.

"Aromatic sulfonate compound" is understood to mean an organic compound comprising at least one aromatic ring, such as a benzene, for example, said aromatic ring carrying at least one sulfonate —SO₃X function. The sulfonate function is preferably connected to a carbon atom being part of the aromatic ring.

The sulfonate compound may be chemically bound to the polyamide chain in diverse manners. The sulfonate compound, once chemically bound to the polyamide chain, may be considered as an attached sulfonate unit. For example, it can be bound chemically to the polyamide chain to form a covalent bond through functions that can react with the amine or carboxylic acid functions in the polyamide monomers such as amine, carboxylic acid, aldehyde, anhydride, hydroxyl, ketone functions, or their derivatives. These functions may be borne or not borne by the aromatic structure of the aromatic sulfonate compound.

This covalent bond is preferably an amide bond but can also be an imine function when any reactive functions in the aromatic sulfonate compound are an aldehyde or a ketone, an imide function when any reactive functions in the aromatic sulfonate compound are an anhydride or a vicinal diacid, or an ester function when any reactive functions in the aromatic sulfonate compound are a hydroxyl.

Moreover, the sulfonate substituents can interact through non-covalent, high energy bonds (H and/or ionic and/or metal complexation bonds in particular) with one or more elements of the polyamide such as residual amine and acid functions at the chain ends, central amide functions, other sulfonate substituents or even other elements present in the polyamide (heteroatoms such as, for example, hydroxyl, ether, secondary or tertiary amine functions, etc.).

Depending on the number of these functions that can react with the amide or carboxylic acid functions on the polyamide, the compound of the invention may be placed in the polymer chain of the polyamide or at the end of the polymer chain.

The sulfonate compound preferably bears either one or more primary amine functions and/or one or more carboxylic acid functions or carboxylic acid derivatives, such as acid chlorides, esters, or anhydrides.

The sulfonate compound of the invention, which will be chemically bound to the polymer chain of the polyamide, can in particular be represented by the general formula (I):

$(Z)_n$—Y—$(SO_3X)_m$      (I)

in which:
—SO3X represents —SO₃H or —SO₃M; M being a substituent that replaces the —SO₃H proton to form an inactive salified group;
m is between 1 and 10 and preferably equal to 1, 2, or 3.
Y is a hydrocarbon substituent comprising from 2 to 100 carbon atoms, linear or cyclic, aromatic or aliphatic and that may comprise heteroatoms.
Z is a function that can react with amine or carboxylic acid functions in the polyamide monomers.
n is between 1 and 10 and preferably equal to 1, 2, or 3.

Mixtures of compounds having formula (I) may in particular be used to make a modified polyamide.

Y comprises preferably from 1 to 24 carbon atoms. Y is preferably a multivalent aromatic hydrocarbon substituent. Y is more preferably a substituent that may in particular include from 6 to 18 carbon atoms. The Y substituent may optionally be substituted, in particular be arylaliphatic. The Y substituent is preferably a benzene or naphthalene substituent optionally substituted by alkyl groups; and can also contain heteroatoms such as oxygen or sulfur.

Z is preferably selected from among —COHal (Hal means halogen), —COOR, —COONRR', —CO—R, —NH₂, R and R', the same or different, being a hydrogen atom or an alkyl group, linear or branched, comprising preferably from 1 to 18 carbon atoms, more preferably from 1 to 4 carbon atoms.

The compound having formula (I) is in particular selected from among the group comprising: sodium 5-sulfoisophthalic acid, lithium 5-sulfoisophthalic acid, potassium 5-sulfoisophthalic acid, sodium-4-carboxybenzene sulfonate, sodium-3-carboxybenzene sulfonate, sodium-2-carboxybenzene sulfonate, lithium-3-carboxybenzene sulfonate, potassium-3-carboxybenzene sulfonate, sodium-3-carbomethoxybenzene sulfonate, potassium-2-carbopropoxybenzene sulfonate, sodium-2-carbomethoxyethylbenzene sulfonate, potassium-3-aminomethylbenzene sulfonate, sodium-2-aminoethylbenzene sulfonate and potassium-3-aminopropylbenzene sulfonate.

It is also possible that the sulfonate compound may not be chemically bound to the polyamide chains. For this, in particular 1,3,(6,7)-naphthalenetrisulfonic acid or one of its salts, such as its sodium salt can be cited (RN CAS: 123409-01-8).

The modified polyamide according to the invention generally comprises from 0.1 to 70 mol % sulfonate unit relative to the total number of moles of units constituting the polymer chain, in particular diacid or diamine units and/or amino acid units in the polymer chain, preferably from 1 to 50%, more preferably from 5% to 30%. Mole of diacid unit or mole of diamine unit is understood in the case of using a diacid/diamine mixture to mean one mole of diacid and one mole of diamine used to prepare the polyamide, in other words is understood to mean one mole of diacid/diamine salt used to prepare the polyamide. Mole of aminocarboxylic acid unit is understood to mean one mole of amino acid or one mole of lactam used to prepare the polyamide. In the case of using a diamine/diacid mixture, if one of the two monomers (diacid or diamine) is used in excess relative to the other, the molar proportion of units containing a sulfonate substituent is calculated relative to the number of moles of units from the surplus monomer.

According to the present invention, the modified polyamide comprising a sulfonate compound bound chemically to the polymer chain of the polyamide may be obtained in diverse manners.

It can be made by adding the sulfonate compound during polymerization when the polyamide is melted, i.e. in liquid state, in the presence of monomers of the polyamides. The sulfonate compound can also be added under hot mix conditions to the polyamide that is formed or partially formed, for example in an extruder. The sulfonate compound can also be added in the solid phase, in particular during a post-condensation. For some polyamides, the sulfonate compound can also be added during polymerization in solution.

In particular making the modified polyamide of the invention by melted-state polymerization, i.e. when liquid, is preferred. The polymerization medium can for example be an aqueous solution comprising the monomers, or a liquid comprising the monomers, in particular water. The modified polyamide of the invention is generally obtained by polycondensation between the monomers of polyamide and the aromatic sulfonate compound, to form polyamide chains, with formation of the elimination product, particularly water, of which a portion can vaporize. The sulfonate compound may be added at the start, in the middle or at the end of the polyamide polymerization, and in the presence or not of a quantity of diamine or diacid to ensure perfect stoichiometry of the reactive functions. This adjustment in stoichiometry modulates the size of the chain of the modified polyamide.

The modified polyamide of the invention is generally obtained by heating at high temperature and pressure, for example an aqueous solution comprising the monomers, or a liquid comprising the monomers, to evaporate the elimination product, particularly the water initially present in the polymerization medium and/or formed during the polycondensation while avoiding any solid phase formation to prevent clumping. The polycondensation is generally continued in the melt phase at atmospheric or reduced pressure so as to achieve the desired degree of progress.

The polycondensation product may also undergo a post-condensation step in solid phase. This step is known to those skilled in the art and makes it possible to increase the degree of polycondensation to a desired value.

A chain limiter may also be used to modulate the size of the chain of the modified polyamide. This chain limiter may bear functions that are not chemically reactive with the polyamide. Non-limiting examples of chain limiters are acetic acid and benzoic acid.

A catalyst may also be used to increase reaction kinetics. Non-limiting examples of catalysts for synthesizing polyamides are for example phosphoric acid, phosphorous acid, sodium hypophosphite, BPO and BPI.

The process of the invention is similar in its conditions to the conventional process for preparing semi-crystalline polyamides or copolyamides.

The modified polyamide according to the invention may in particular comprise at least one unit containing a sulfonate substituent having the following formula (II):

$$-L-Y-(SO_3X)_m \quad (II)$$

in which:
- -L is a substituent derived from the condensation of two reactive functions, one of which reactive function is Z; and
- Y, X, Z, and m are as defined previously.

The polyamide according to the invention is a (co) polyamide comprising at least one of the aliphatic monomers and optionally aromatic monomers. The aliphatic monomers may be in particular aliphatic diacids, aliphatic diamines, or aliphatic amino acids. In particular hexamethylene diamine, 2-methyl-1,5-pentanediamine (M), putrescine, cadaverine, 1,10-diaminodecane, adipic acid, pimellic acid; azelaic acid, sebacic acid, 1,12-dodecandioic acid, aminocaproic acid, caprolactam, 11-amino undecanoic acid, and 12-amino dodecanoic acid can be cited. The aromatic monomers may in particular be aromatic diacids such as terephthalic acid and isophthalic acid.

In the sense of the invention polyamide is understood to mean a polymer comprising at least 51 mol % of diamine or diacid monomers or amino acids or lactams and resulting from the polymerization reaction of acid and amine functions forming said amide functions. The polyamide may also comprise other functions, such as ester and/or ether functions, for example.

According to a preferred embodiment of the invention, the modified polyamide is a polyamide such as polyamide 6, polyamide 66, polyamide 10, polyamide 11, polyamide 610, polyamide 1010, polyamide 12, polyamide 6I, copolyamides 66/6T, 66/6I, 6T/MT (M=2-methyl pentane diamine), 6T/6I with different molar proportions, and mixtures and copolymers containing these polyamides.

The composition of the invention can also comprise copolyamides derived in particular from the above polyamides, or the blends of these polyamides or copolyamides.

The preferred polyamides are polyhexamethylene adipamide, polycaprolactam, or copolymers and mixtures of polyhexamethylene adipamide and polycaprolactam.

Use is generally made of polyamides with a molecular weight suitable for injection molding or blow-molding extrusion processes, although it is also possible to use polyamides having lower or higher viscosities.

The modified polyamide may in particular be a polymer comprising star or H, branched, ramified or hyper-ramified macromolecular chains, and if need be linear macromolecular chains. Polymers comprising such star or H macromolecular chains are, for example, described in the documents FR 2 743 077, FR 2 779 730, U.S. Pat. No. 5,959,069, EP 0 672 703, EP 0 682 057 and EP 0 832 149.

The modified polyamide can be a polymer of random tree type, preferably a copolyamide exhibiting a random tree structure. These copolyamides with a random tree structure and their process of preparation are described in particular in the document WO99/03909. The matrix of the invention can also be a composition comprising a linear thermoplastic polymer and a star, H and/or tree thermoplastic polymer as described above. The matrix of the invention can also comprise a hyperbranched copolyamide of the type of those described in the document WO 00/68298. The composition of the invention can also comprise any combination of linear, star, H, and tree thermoplastic polymer and hyperbranched copolyamide as described above.

The composition according to the invention preferably exhibits at least 30% by weight of polyamide, in particular from 30% to 95% by weight of polyamide, preferably from 40% to 80% by weight, relative to the total weight of the composition.

The composition may also comprise, depending on the desired final property, a mixture of modified polyamide according to the invention and one or more other polymers, such as, for example, polyamide, polyester, polyolefins, polystyrene, the resin ABS, polycarbonate, polyphenylene sulfide, polyphenylene oxide, polyacetal, polysulfone, polyethersulfone, polyetherimide, polyetherketone, a polylactic acid resin, a polysulfone resin, an elastomer resin or mixtures thereof.

The composition can also comprise reinforcing or bulking fillers, such as, for example, fibrous fillers, and/or nonfibrous fillers.

Mention may be made, as fibrous fillers, of glass fibers, carbon fibers, natural fibers, aramid fibers and nanotubes, in particular carbon nanotubes. Mention may be made, as natural fibers, of hemp and flax. Mention may in particular be made, among nonfibrous fillers, of all particulate or lamellar fillers and/or exfoliable or nonexfoliable nanofillers, such as alumina, carbon black, aluminosilicate clays, montmorillonites, zirconium phosphate, kaolin, calcium carbonate, diatomaceous earths, graphite, mica, silica, titanium dioxide, zeolites, talc, wollastonite, polymeric fillers, such as, for example, dimethacrylate particles, glass beads or glass powder.

It is perfectly possible according to the invention for the composition to comprise several types of reinforcing fillers. Preferably, the most widely used filler can be glass fibers, of the "chopped" type, in particular having a diameter of between 7 and 14 μm. These fillers can exhibit a surface sizing that provides for mechanical adhesion between the fibers and the polyamide matrix.

The concentration by weight of the reinforcing or bulking fillers is advantageously between 1% and 60% by weight, preferably between 15% and 50% by weight, with respect to the total weight of the composition.

The composition according to the invention may further comprise additives usually used to manufacture polyamide compositions. Accordingly, lubricants, flame retardants, plasticizers, nucleating agents, impact modifiers, catalysts, light and/or heat stabilizers, antioxidants, antistatic agents, colorants, matiffying agents, molding aids or other conventional additives.

In particular, it is possible to add to the polyamide composition, agents that modify the impact strength. It is generally elastomeric polymers that can be used to this end. The agents that modify the toughness are generally defined as having an ASTM D-638 tensile modulus of less than approximately 500 MPa. Examples of suitable elastomers are ethylene/acrylic ester/maleic anhydrides, ethylene/propylene/maleic anhydrides or ethylene/propylene/diene monomers (EPDMs) with optionally a grafted maleic anhydride, and ionomers. The concentration of elastomer by weight is advantageously between 0.1% and 30%, with respect to the total weight of the composition.

Preference is given in particular to impact modifiers comprising functional groups that react with the polyamide. Mention may be made, for example, of terpolymers of ethylene, acrylic ester and glycidyl methacrylate, copolymers of ethylene and butyl ester acrylate, copolymers of ethylene, n-butyl acrylate and glycidyl methacrylate, copolymers of ethylene and maleic anhydride, styrene/maleimide copolymers grafted with maleic anhydride, styrene/ethylene/butylene/styrene copolymers modified with maleic anhydride, styrene/acrylonitrile copolymers grafted with maleic anhydride, acrylonitrile/butadiene/styrene copolymers grafted with maleic anhydride, and their hydrogenated versions. The proportion by weight of these modifiers in the total composition is in particular between 0.1% and 40%.

These fillers and additives may be added to the modified polyamide by normal means suited to each filler or additive, such as, for example, during the polymerization or in the melt blending.

The polyamide composition may optionally comprise a novolac resin. Novolac resins are generally the condensation products of phenolic compounds with aldehydes or ketones. These condensation reactions are generally catalyzed by an acid or a base.

The term "novolac resin" is generally understood to mean a phenolic resin for which the formaldehyde/phenol ratio is less than 1, and which, for this reason, normally remains thermoplastic until it has been heated with an appropriate amount of a compound, for example formaldehyde or hexamethylenetetramine, capable of giving additional bonds and consequently of giving an infusible product.

The polyamide according to the invention may comprise one or more different types of novolac resin.

The novolac resins generally exhibit a degree of condensation of between 2 and 15.

The phenolic compounds can be chosen, alone or as mixtures, from phenol, cresol, xylenol, naphthol, alkylphenols, such as butylphenol, tert-butylphenol or isooctylphenol, nitrophenol, phenylphenol, resorcinol or bisphenol A; or any other substituted phenol.

The aldehyde most frequently use is formaldehyde. However, use may be made of others thereof, such as acetaldehyde, paraformaldehyde, butyraldehyde, crotonaldehyde, glyoxal, and furfural. Use may be made, as ketone, of acetone, methyl ethyl ketone, or acetophenone. The aldehyde and/or the ketone can optionally carry another functional group, such as, for example, a carboxylic acid functional group. To this end, mention may in particular be made of glyoxylic acid or levulinic acid.

According to a specific embodiment of the invention, the novolac resin is a condensation product of phenol and formaldehyde.

The novolac resins used advantageously have a molecular weight of between 500 and 3000 g/mol, preferably between 800 and 2000 g/mol.

Mention may in particular be made, as commercial novolac resin, of the commercial products Durez®, Vulkadur® or Rhenosin®.

The materials and compositions of the invention are generally obtained by blending the various constituents under hot conditions, for example in a single- or twin-screw extruder, at a temperature sufficient to keep the polyamide resin as a molten medium, or under cold conditions, in a mechanical mixer in particular. Generally, the blend obtained is extruded in the form of rods, which are cut up into pieces to form granules. The compounds can be added at any point in the process for the manufacture of the plastic, in particular by hot or cold blending with the plastic matrix. The addition of the compounds and additives can be carried out by addition of these compounds to the molten plastic matrix in the pure form or in the form of a concentrated mixture in a matrix, such as, for example, a plastic matrix.

The granules obtained are then generally used as a raw material to feed the manufacturing processes of articles such as injection, extrusion, blow-molding extrusion processes.

The invention also relates to articles obtained by shaping the composition of the invention, by any technique of plastic transformation, such as, for example, by extrusion, such as, for example, extrusion of sheets and films or blow-molding extrusion; by molding such as, for example compression molding, thermoforming molding or rotational molding; by injection such as, for example by injection molding or by injection blow-molding.

The invention more specifically relates to articles that contain or transport a fluid, comprising at least one part based on a composition as described previously. These are therefore generally hollow bodies or films and packaging articles. These articles are in particular selected from the group comprising: tanks, containers, vats, bottles, boxes, tubes, hoses, pipes, pump components, or derivatives.

The composition or material according to the present invention may be deposited or combined with another substrate, such as plastic materials to make articles, in particular multilayer articles. This deposit or this combination can be made by known methods of co-extrusion, lamination, coating, overmolding, co-injection, multilayer injection blow-molding, or welding. Multilayer structures may be formed of one or more layers of material according to the invention. These layers may be combined in particular by layers of co-extrusion binder to one or more other layers of one or more thermoplastic polymers, for example polyolefins such as polyethylene and polypropylene, vinyl polychloride, polyethylene terephthalate, polytrimethylene terephthalate, polybutylene terephthalate, MXD6, PA 11, PA 12, PA 6.10, PA 6.12, polyfluorovinylidene (PVDF), polyphenylene sulfide (PPS), ethylene-vinyl alcohol copolymer (EVOH), copolymers PA 6/6.36, 6/6.9, 6/6.10.

The films or sheets thus obtained may be mono-stretched or bi-stretched according to known transformation techniques for thermoplastics. The sheets or plates may be cut, thermoformed and/or punched to give them the desired shape.

Specific language is used in the description so as to facilitate understanding of the principle of the invention. Nevertheless, it should be understood that no limitation of the scope of the invention is envisaged by the use of this specific language. Modifications and improvements may in particular be envisaged by a person conversant with the technical field concerned on the basis of his own general knowledge. The term "and/or" includes the meanings "and", "or" and all the other possible combinations of the elements connected to this term. Other details or advantages of the invention will become more clearly apparent in the light of the examples given below purely by way of indication.

EXPERIMENTAL SECTION

Characterizations
Physicochemical Property Analysis
Terminal acid group (TCG) and terminal amine group (TAG) content: assayed by potentiometry, expressed in meq/kg.
When the sulfonate compound is a monofunctional monosulfonate, we can calculate the terminal sulfonate group content (TSG) from the quantities of reagents added to the polymerization reactor.
Number-average molecular weight Mn determined by the formula $Mn=2.10^6/(TAG+TCG+TSG)$ and expressed in g/mol.
When the sulfonate compound is a monofunctional monosulfonate, we can calculate the number of sulfonate chain ends per chain as follows: Nsulfonate/chain=TSG/((TAG+TCG+TSG)/2).
Heat Property Analysis
For granules prepared by synthesis: the melting point (Tf) and associated enthalpies ($\Delta Hf$), and crystallization temperatures (Tc) are determined by Differential Scanning Calorimetry (DSC), using a Perkin Elmer Pyris 1 device, at a rate of 10° C./min. The crystallinity level is obtained by calculating $\chi c=\Delta Hf/\Delta Hf°$, where $\Delta Hf°$ is the enthalpy of fusion of a pure polyamide crystal ($\Delta Hf°(PA66)=188$ J/g). Glass transition temperature (Tg) determined on the same device at a rate of 40° C./min. The values are given for dry products.
For transformed objects (films, injected plates): the melting points (Tf), crystallization temperatures (Tc) and glass transition temperatures (Tg) of films obtained are determined by Differential Scanning Calorimetry (DSC), using a TA Instruments Q2000 device, at a rate of 10° C./min. The crystallinity level is obtained by calculating $Xc=\Delta Hf/\Delta Hf°$, where $\Delta Hf$ is the enthalpy of fusion of the polyamide sample tested and $\Delta Hf°$ is the enthalpy of fusion of a pure polyamide crystal ($\Delta Hf°(PA66)=188$ J/g). The values are given for dry products.
Permeability to Gasoline Analysis:
Extruded films, injected or blow-molded parts are either dried at 110° C. under vacuum overnight or packaged at 23° C. at relative humidity of 50% (RH50) until their water uptake reaches equilibrium. Permeability to gasoline (for example gasoline E10 containing 10% by volume ethanol, 45% iso-octane and 45% toluene) is then evaluated: one of the faces of the film is placed in contact with the gasoline using aluminum permeation cups sealed tightly, and the mass of the ensemble (cup+film+gasoline) is measured over time. After a certain time called the induction time, a mass loss corresponding to gasoline permeation through the polymer film is measured, and a permeability value representing this mass loss related to time, at the film surface and multiplied by the film thickness can be established (Permeability P expressed in $g.mm/m^2.J$).

The permeability of films to gasoline is measurement at 28° C. and/or at 40° C. by placing the permeation cups in ventilated heat-controlled ovens at 28° C. or 40° C. The ventilated ovens are located in a room regulated at 23° C. at RH50, so the humidities in the oven are 40% and 20% at 28° C. and 40° C. respectively.

COMPARISON EXAMPLE 1

Synthesis of an Unmodified Pa 66

To a polymerization reactor are added 92.6 kg (353 mol) of salt N (1:1 hexamethylene diamine and adipic acid salt), 84 kg of deionized water and 6.4 g antifoam agent Silcolapse 5020®. The polyamide 66 is made according to a standard polyamide 66 polymerization process, with 30 minutes finishing. The polymer obtained is poured into rods, cooled, and shaped into granules by cutting the rods.
The polymer obtained presents the following characteristics: TCG=70.2 meq/kg, TAG=51.5 meq/kg, Mn=16,430 g/mol.
The polyamide 66 is semi-crystalline and has the following heat characteristics: Tg=70.6° C., Tc=230.9° C., Tf=263.7° C., $\Delta Hf$ =68.4 J/g, i.e. $\chi c$=36.4%.

EXAMPLE 1

Synthesis of a Polyamide 66 Sulfonate PA 66/6AlSLi 95/5

To a polymerization reactor are added 85.9 kg (327.5 mol) of salt N (1:1 salt of hexamethylene diamine and adipic acid), 4,657 g of lithium 5-sulfoisophthalic acid salt at 93.33% (AlSLi) (17.24 mol), 6,435 g of a solution of hexamethylene diamine (HMD) in solution in water at 32.47% by weight (17.98 mol) and 81.2 kg of deionized water and 6.4 g of Silcolapse 5020® antifoaming agent. The polyamide 66 sulfonate is made according to a standard polyamide 66 polymerization process, with 30 minutes finishing at atmospheric pressure. The polymer obtained is poured into rods, cooled, and shaped into granules by cutting the rods.
The polymer obtained presents the following characteristics: TCG=102.6 meq/kg, TAG=94.3 meq/kg, Mn=10,160 g/mol.
The polyamide 66 sulfonate PA 66/6AlSLi 95/5 is semi-crystalline and has the following thermal characteristics: Tg=92.5° C., Tc=215.4° C., Tf=254.5° C., $\Delta Hf$ =56.7 J/g i.e. $\chi c$=30.2%. The sulfonate polyamide, in spite of a lower molar mass, has a much higher Tg, about 22° C. higher than that of PA 66 while reducing the crystallinity level by only 17%.

EXAMPLE 2

Synthesis of a Polyamide 66 Sulfonate PA 66/6AlSLi 90/10

To a polymerization reactor are added 128.98 g (0.492 mol) of salt N (1:1 salt of hexamethylene diamine and adipic acid), 14.77 g of lithium 5-sulfoisophthalic acid salt at 93.33% (AlSLi) (0.0547 mol), 21.2 g of a solution of hexamethylene diamine (HMD) in solution in water at 32.5% by weight (0.0593 mol) and 122.73 g of deionized water and 2 g of an aqueous solution of antifoaming agent. The polyamide 66/6AlSLi 90/10 sulfonate is made according to a standard polyamide 66 polymerization process, with 45 minutes finishing at atmospheric pressure. The polymer obtained is poured into rods, cooled, and shaped into granules by cutting the rods.

The polymer obtained presents the following characteristics: TCG=138.7 meq/kg, TAG=114.6 meq/kg, Mn=7,900 g/mol.

The polyamide 66/6AlSLi 90/10 sulfonate is semi-crystalline and has the following thermal characteristics: Tg=99.5° C., Tc=175.4° C., Tf=242.3° C., ΔHf =41 J/g i.e. χc=21.8%. The polyamide sulfonate, in spite of a lower molar mass, has a much higher Tg, about 29° C. higher relative to that of PA 66, to reduce the crystallinity level of PA 66 by 40%.

EXAMPLE 3

Preparation of Films of PA 66 and Functionalized PA 66 Sulfonate PA 66/6AlSLi 95/5 and Measuring E10 Gasoline Permeability The granules of PA 66 from comparison example 1 or PA 66/6AlSLi 95/5 from example 1 are added in a twin-screw co-rotating Leistritz extruder (D=34, L/D=35), with screw rate 255 rpm and temperature 280° C. An OCS wrapping machine with a flat sheet die (width 300, gap 500 μm) delivers films 300-μm thick, the film coming out of the die being stretched at a rate of 2 m/minute, the cooling roll temperature being 135° C.

The films obtained have the following thermal characteristics:
PA 66: Tg=56° C., Tf=260° C., Tc=231° C., χc=37%
PA 66/6AlSLi 95/5: Tg=78° C., Tf=251° C., Tc=221° C., χc=34%, Before evaluating permeability, the films are adjusted to RH50 at 23° C. until their water uptake reaches equilibrium (water uptake 3.2% for PA6.6 and 3.8% for PA66/6AiSLi 95/5).

At 28° C., the permeability of PA 66 to E10 gasoline is 1.56 g.mm/m².J, while the permeability of PA66/6AlSLi 95/5 is 0.55 g.mm/m².J (i.e. a reduction in permeability of 65%).

At 40° C., the permeability of PA 66 to E10 gasoline is 1.92 g.mm/m².J, while the permeability of PA66/6AlSLi 95/5 is 0.83 g.mm/m².J (i.e. a reduction in permeability of 57%).

Accordingly, the PA 66/6AlSLi 95/5, in spite of a lower crystallinity level than PA 66, has E10 gasoline permeability about 2.5 times lower than PA 66.

At 40° C., the permeability of PA 66 to E100 gasoline (pure ethanol) is 5.44 g.mm/m².J, while the permeability of PA66/6AlSLi 95/5 is 1.35 g.mm/m².J (i.e. a reduction in permeability of 75%).

EXAMPLE 4

Formulations, Plate Injections, and Measuring Permeability to E10 Gasoline

Before extrusion, the polyamides are dried at a water content below 1000 ppm. Formulations are made by mixing various molten components and additives in a twin-screw co-rotating WERNER & PLEIFEDER ZSK 40 extruder operating at 40 kg/h and at a rate of 270 rpm. The temperature settings in the 8 zones are respectively: 245, 255, 255, 255, 255, 260, 260, 270° C. All the components in the formulation are added at the start of the extruder.

The additives used are as follows:
ExxonMobil Chemical Elastomer called EXXELOR VA1801
Novolak S phenolic resin by Plastics Production Plant ZTS "ERG" in Pustków S. A.

The formulations comprise 4% of a mixture of colorant, stabilizer, and lubricant.

To analyze permeability, plates 100×100×0.8 mm³ are injected on a DEMAG 80 T machine with screw diameter 25 mm (Tbarrel=270° C., Tmold=85° C., cycle time 24.6 s). Before evaluating permeability, the plates are dried at 110° C. under vacuum overnight.

4-mm-thick test pieces called multifunctions are injected to characterize the tensile and impact mechanical properties. The test pieces are tested quickly after injection and considered to be dry (Dry as molded).

The formulations and properties are collected in the following table 1:

|  | CF1 | CF2 | F1 | F2 | F3 |
| --- | --- | --- | --- | --- | --- |
| Rhodia 31A00 (IV = 170 mL/g) type PA 66 | 71% | 66% | — | — | 33% |
| PA 66/6AlSLi 95/5 (ex. 1) | — | — | 71% | 66% | 33% |
| Exxelor VA1801 Elastomer | 25% | 25% | 25% | 25% | 25% |
| Novolac phenolic resin | — | 5% | — | 5% | 5% |
| E10 permeability at 40° C. (g · mm/m² · J) | 3.0 | 1.47 | 0.45 | 0* | 0.51 |
| Tensile stress at the break point at 23° C. (MPa) - ISO 527/1A | 44 +/− 1.0 | 43 +/− 0.3 | 45 +/− 0.3 | 44 +/− 0.4 | 43 +/− 0.5 |
| Tensile modulus at 23° C. (MPa) - ISO 527/1A | 1560 +/− 130 | 1643 +/− 60 | 1552 +/− 63 | 1634 +/− 114 | 1568 +/− 44 |
| Charpy notch impact at 23° C. - ISO 179-1/1eA | 106.7 +/− 3 | — | 96 +/− 1.9 | 87 +/− 1.6 | 95 +/− 1.9 |
| Charpy notch impact at −40° C. - ISO 179-1/1eA | 29.2 +/− 2.5 | 26 +/− 1.5 | 24 +/− 2.8 | 23 +/− 2.6 | 25 +/− 2.3 |

The % are expressed as weight, relative to the total weight of the composition.

0*: no permeation after 50 days.

The invention claimed is:

1. A method of improving fluid barrier properties of a fluid container, the method comprising reducing the fluid permeability of the fluid container by fabricating the fluid container from a polyamide composition comprising:
a (co)polyamide comprising at least one aliphatic monomer and optionally at least one aromatic monomer in a polymer chain, and
at least one novolac resin,
wherein the reduced fluid permeability reduces permeability of a gasoline comprising 10 volume percent ethanol, 45% iso-octane, and 45% toluene,
wherein the fluid container is a tube, pipe, or tank intended to contain or transport a fluid,
wherein said (co)polyamide is modified by a sulfonate compound, in an amount of from 5 to 10 mol percent sulfonate unit relative to the total number of moles of units constituting the polymer chain,
wherein the resulting fluid container has reduced fluid permeability to the gasoline when compared with a corresponding fluid container made with a (co)polyamide which is not modified with the sulfonate compound,
wherein the (co)polyamide is a semi-crystalline (co)polyamide,
wherein the modified (co)polyamide is in a composition comprising 30% to 95% by weight of said (co)polyamide, relative to the total weight of the composition, and
wherein the modified (co)polyamide comprises a polyamide selected from the group consisting of a polyamide 6, a polyamide 66, a polyamide 10, a polyamide 11, a polyamide 610, a polyamide 1010, a polyamide 12, a polyamide 6I, a copolyamide 66/6T, a copolyamide 66/6I, a copolyamide 6T/MT, and a copolyamide 6T/6I.

2. The method as described in claim 1, wherein the sulfonate compound comprises as least one SO$_3$X function, wherein SO$_3$X represents SO$_3$H or SO$_3$M; M being a substituent that replaces the SO$_3$H proton H$^+$ to form an inactive salified group.

3. The method as described in claim 1, wherein the sulfonate compound is an aromatic sulfonate compound.

4. The method as described in claim 1, wherein the sulfonate compound is bound chemically to a polyamide chain to form a covalent bond through a function of said sulfonate compound that can react with the amine or carboxylic functions in the polyamide monomers, wherein the function of the sulfonate compound is selected from the group consisting of an amine, a carboxylic acid, an aldehyde, an anhydride, a hydroxyl, a ketone function and their derivatives.

5. The method as described in claim 1, wherein the sulfonate compound is placed in a polymer chain of the (co)polyamide or at the end of the polyamide chain.

6. The method as described in claim 1, wherein the sulfonate compound is represented by the general formula (I):

$$(Z)_n\text{—}Y\text{—}(SO_3X)_m \quad (I)$$

in which:
SO$_3$X represents SO$_3$H or SO$_3$M, M being a substituent that replaces the SO$_3$H proton H$^+$ to form an inactive salified group;
m is from 1 to 10;
Y is a hydrogen substituent comprising from 2 to 100 carbon atoms, linear or cyclic, aromatic or aliphatic and that can comprise heteroatoms;
Z is a function that can react with amine or carboxylic acid functions in the polyamide monomers; and
n is from 1 to 10.

7. The method as described in claim 1, wherein the sulfonate compound is selected from the group consisting of: a sodium 5-sulfoisophthalic acid, a lithium 5-sulfoisophthalic acid, a sodium-4-carboxybenzene sulfonate, a sodium-3-carboxybenzene sulfonate, a sodium-2-carboxybenzene sulfonate, a lithium-3-carboxybenzene sulfonate, a potassium-3-carboxybenzene sulfonate, a sodium-3-carbomethoxybenzene sulfonate, a potassium-2-carbopropoxybenzene sulfonate, a sodium-2-carbomethoxyethylbenzene sulfonate, a potassium-3-aminomethylbenzene sulfonate, a sodium-2-aminoethylbenzene sulfonate and a potassium-3-aminopropylbenzene sulfonate.

8. The method as described in claim 1, wherein the modified (co)polyamide is in a composition comprising 40% to 80% by weight of said (co)polyamide, relative to the total weight of the composition.

9. The method as described in claim 1, wherein the modified (co)polyamide is comprised of a composition comprising an agent modifying impact strength.

10. The method as described in claim 1, wherein the modified (co)polyamide is comprised of a deposited composition or is associated with another substrate.

11. The method as described in claim 1, wherein the fluid container having reduced fluid permeability is a multilayer article.

12. A method of improving gasoline barrier properties of a gasoline container, the method comprising reducing the gasoline permeability of the gasoline container by fabricating the gasoline container from a (co)polyamide comprising at least one aliphatic monomer and optionally at least one aromatic monomer in a polymer chain, and at least one novolac resin,
wherein the reduced gasoline permeability reduces permeability of a gasoline comprising 10 volume percent ethanol, 45% iso-octane, and 45% toluene,
wherein the gasoline container is a tube, pipe, or tank intended to contain or transport a gasoline intended to contain or transport a fluid,
wherein the (co)polyamide is modified by a sulfonate compound, in an amount of from 5 to 10 mol percent sulfonate unit relative to the total number of moles of units constituting the polymer chain,
wherein the (co)polyamide is semi-crystalline (co)polyamide,
wherein the modified (co)polyamide is in a composition comprising 30% to 95% by weight of said (co)polyamide, relative to the total weight of the composition,
wherein the modified (co)polyamide comprises a polyamide selected form the group consisting of a polyamide 6, a polyamide 66, a polyamide 10, a polyamide 11, a polyamide 610, a polyamide 1010, a polyamide 12, a polyamide 6I, a copolyamide 66/6T, a copolyamide 66/6I, a copolyamide 6T/MT, and a copolyamide 6T/6I, and
wherein the resulting gasoline container has reduced gasoline permeability to wherein the gasoline when compared with a corresponding gasoline container made with a (co)polyamide which is not modified with the sulfonate compound.

13. A method of fabricating a gasoline container with improved gasoline barrier properties, the method comprising:

modifying a (co)polyamide with a sulfonate compound;

wherein the modified (co)polyamide is in a composition comprising 30% to 95% by weight of said (co)polyamide, relative to the total weight of the composition;

wherein the modified (co)polyamide comprises a polyamide selected form the group consisting of a polyamide 6, a polyamide 66, a polyamide 10, a polyamide 11, a polyamide 610, a polyamide 1010, a polyamide 12, a polyamide 6I, a copolyamide 66/6T, a copolyamide 66/6I, a copolyamide 6T/MT, and a copolyamide 6T/6I, and molding the modified (co)polyamide into an article selected from the group consisting of a tube, a pipe, and a tank intended to contain or transport a fluid;

wherein the container comprises at least one novolac resin;

wherein the (co)polyamide is a semi-crystalline (co)polyamide;

wherein the (co)polyamide comprises at least one aliphatic monomer and optionally at least one aromatic monomer in a polymer chain;

wherein said (co) polyamide is modified by the sulfonate compound in an amount of from 5 to 10 mol percent sulfonate unit relative to the total number of moles of units constituting the polymer chain;

wherein the improved gasoline barrier properties reduces permeability of a gasoline comprising 10 volume percent ethanol, 45% iso-octane, and 45% toluene; and wherein the resulting container has reduced fluid permeability to the gasoline when compared with a corresponding container made with a (co)polyamide which is not modified with the sulfonate compound.

* * * * *